United States Patent
Li

(10) Patent No.: US 8,104,936 B2
(45) Date of Patent: Jan. 31, 2012

(54) STRADDLE-TYPE VEHICLE

(75) Inventor: Tzu-Pin Li, Taoyuan County (TW)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 134 days.

(21) Appl. No.: 12/678,810

(22) PCT Filed: Sep. 16, 2008

(86) PCT No.: PCT/JP2008/066687
§ 371 (c)(1),
(2), (4) Date: Mar. 18, 2010

(87) PCT Pub. No.: WO2009/038055
PCT Pub. Date: Mar. 26, 2009

(65) Prior Publication Data
US 2010/0214794 A1    Aug. 26, 2010

(30) Foreign Application Priority Data
Sep. 18, 2007  (JP) ................. 2007-241644

(51) Int. Cl.
*B62J 6/00*  (2006.01)

(52) U.S. Cl. ....... 362/475; 362/476; 362/473; 296/78.1; 296/82

(58) Field of Classification Search .................. 362/473, 362/474, 475, 476, 505, 506, 507; 296/78.1, 296/82; 180/219
See application file for complete search history.

(56) References Cited

U.S. PATENT DOCUMENTS

| | | | |
|---|---|---|---|
| 7,367,701 B2 * | 5/2008 | Lee | 362/476 |
| 7,401,953 B2 * | 7/2008 | Isayama | 362/474 |
| 7,438,340 B2 * | 10/2008 | Kurihara | 296/78.1 |
| 7,537,362 B2 * | 5/2009 | Kushida et al. | 362/473 |
| 7,674,023 B2 * | 3/2010 | Ohira | 362/475 |
| 7,731,263 B2 * | 6/2010 | Tanaka | 296/78.1 |
| 7,762,609 B2 * | 7/2010 | Mochizuki | 296/78.1 |
| 7,802,907 B2 * | 9/2010 | Uemura et al. | 362/476 |
| 2005/0257974 A1 | 11/2005 | Nakagawa et al. | |
| 2006/0048991 A1 | 3/2006 | Sunaguchi et al. | |

FOREIGN PATENT DOCUMENTS

| | | |
|---|---|---|
| JP | 2001-039373 A | 2/2001 |
| JP | 2003-165477 A | 6/2003 |
| JP | 2005-035526 A | 2/2005 |
| JP | 2006-001523 A | 1/2006 |
| JP | 2006-069404 A | 3/2006 |
| JP | 2006-199292 A | 8/2006 |
| JP | 2007-038727 A | 2/2007 |

* cited by examiner

*Primary Examiner* — Ali Alavi
(74) *Attorney, Agent, or Firm* — Rabin & Berdo, PC

(57) ABSTRACT

A straddle-type vehicle includes a head light having a lens face, and an auxiliary light arranged above the head light and having a lens face. The auxiliary light is arranged behind the head light. Moreover, the straddle-type vehicle has an outside cover part formed on the sides of the head light and the auxiliary light. The outside cover part is inclined rearward and upward at a specified inclined angle, and the head light and the lens face are inclined at a smaller angle than is the outside cover part.

13 Claims, 17 Drawing Sheets

[Fig. 1]
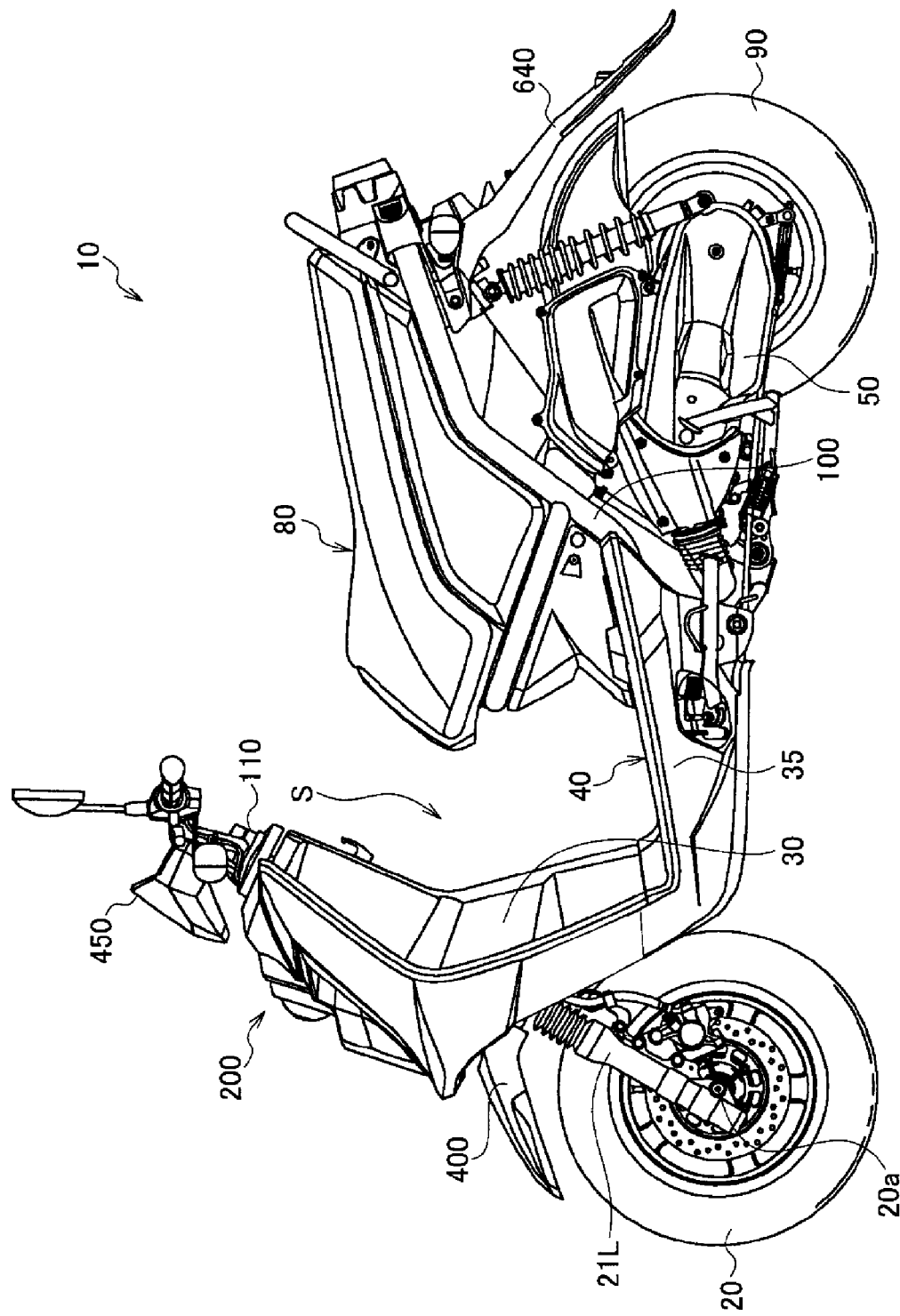

[Fig.2]
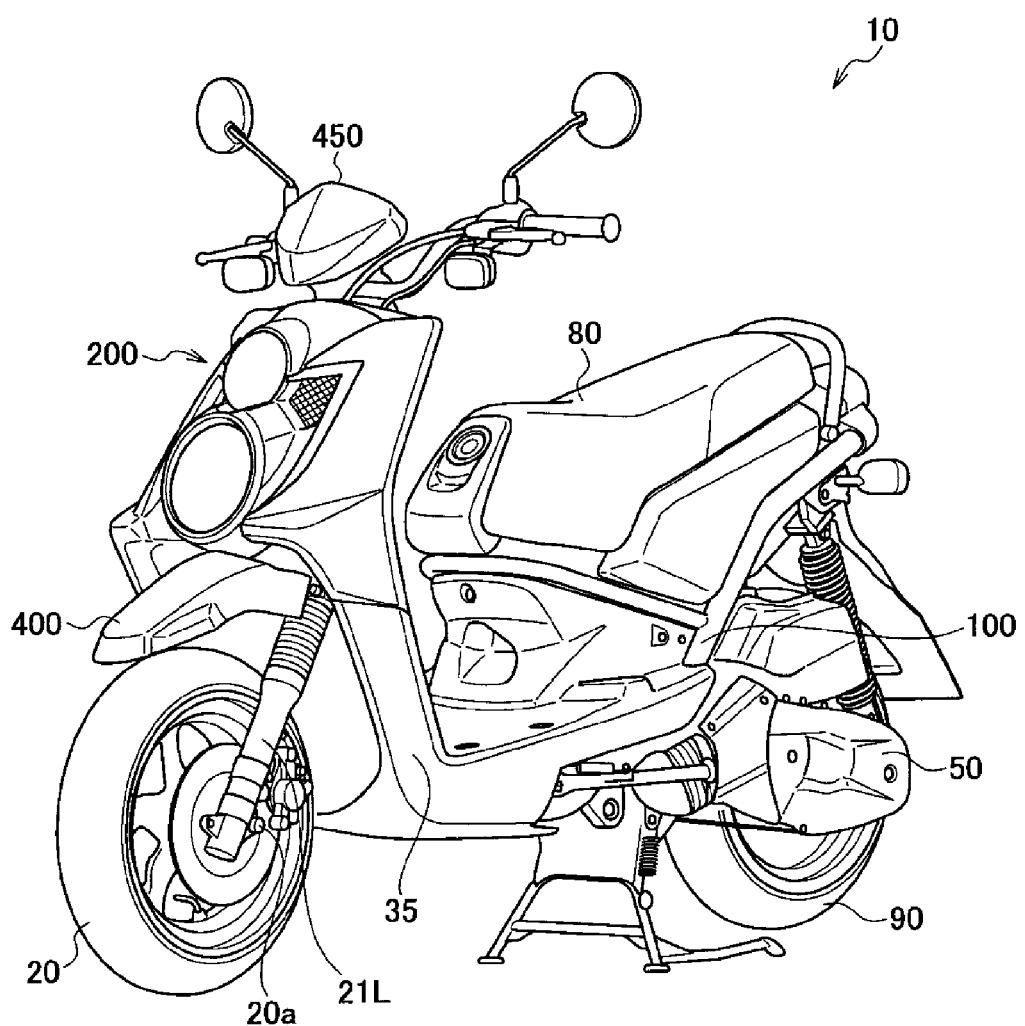

[Fig. 3]
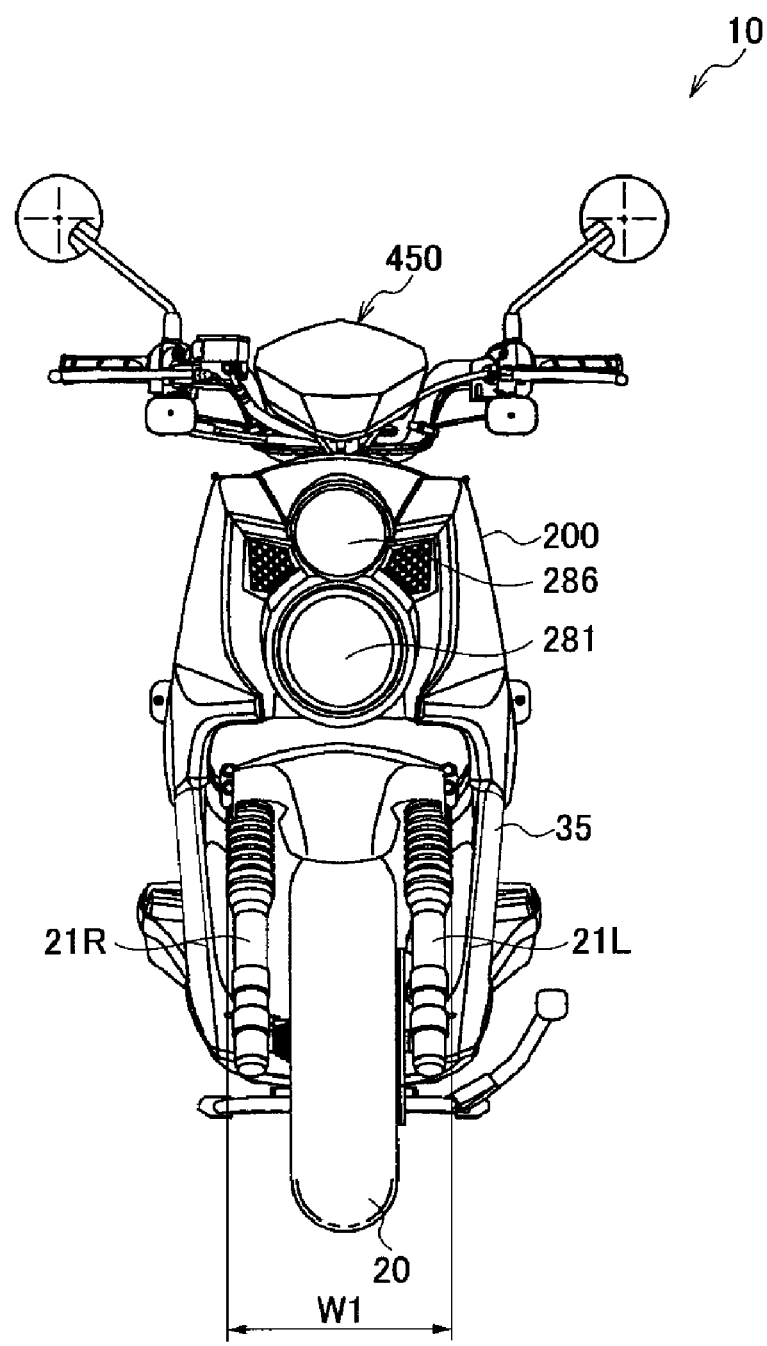

[Fig. 4]
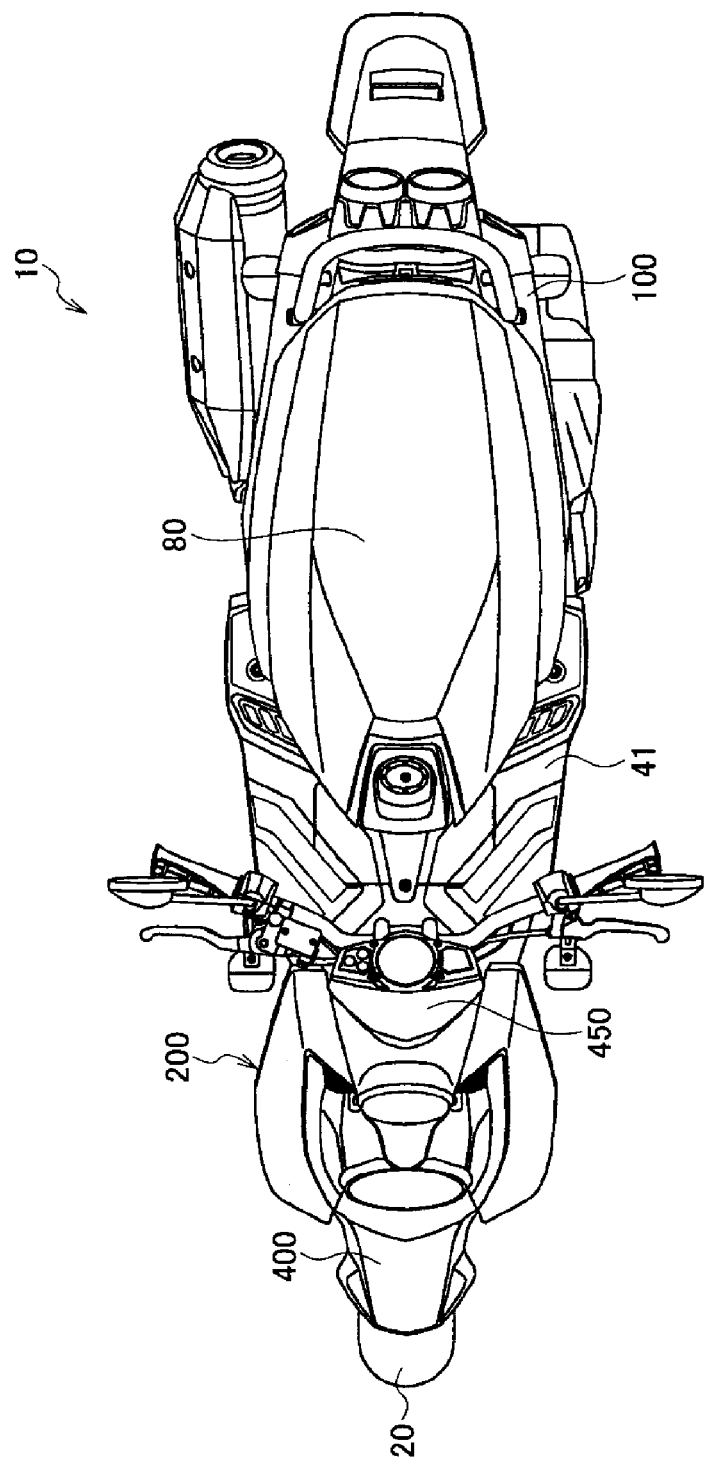

[Fig. 5]
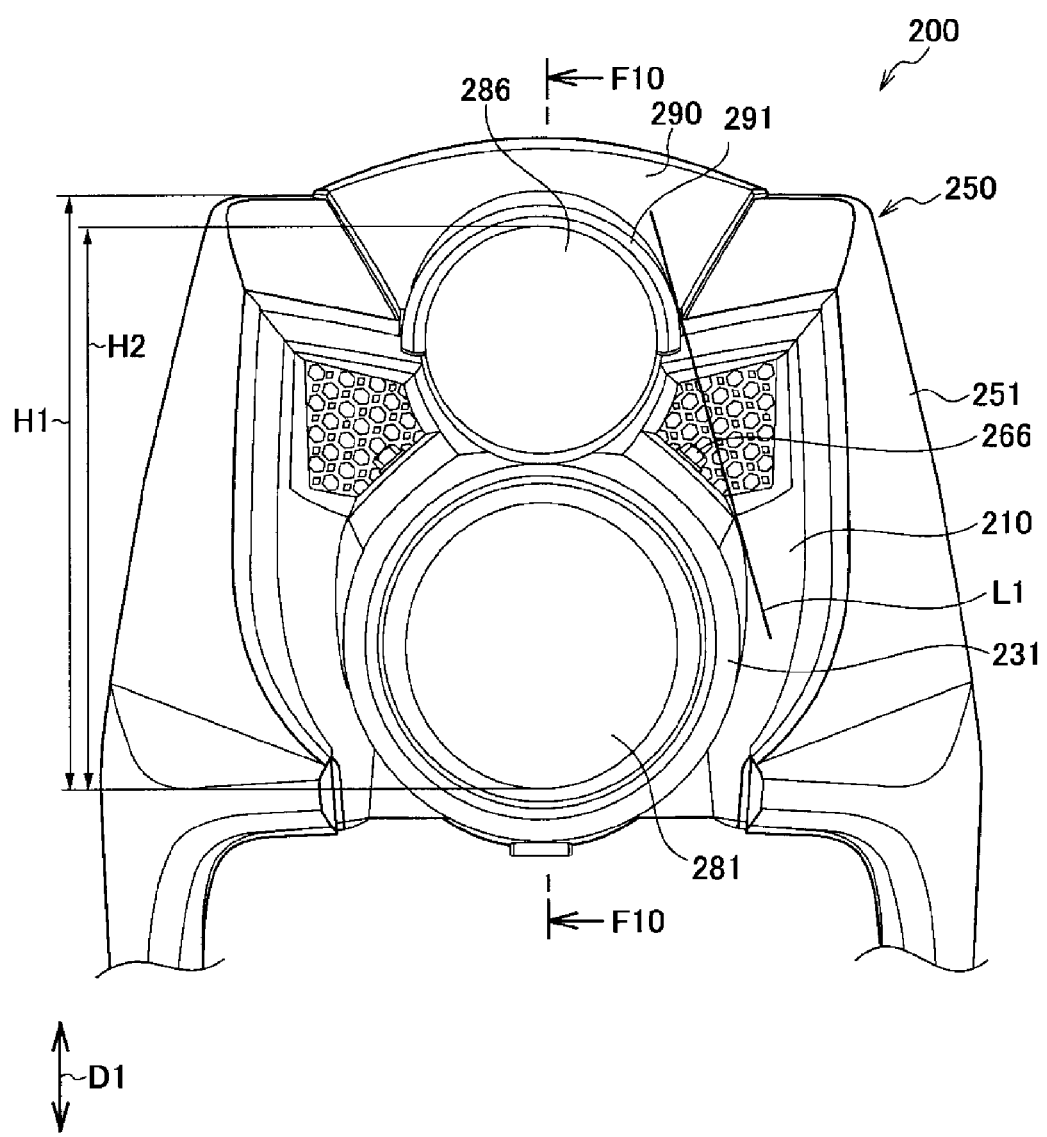

[Fig. 6]
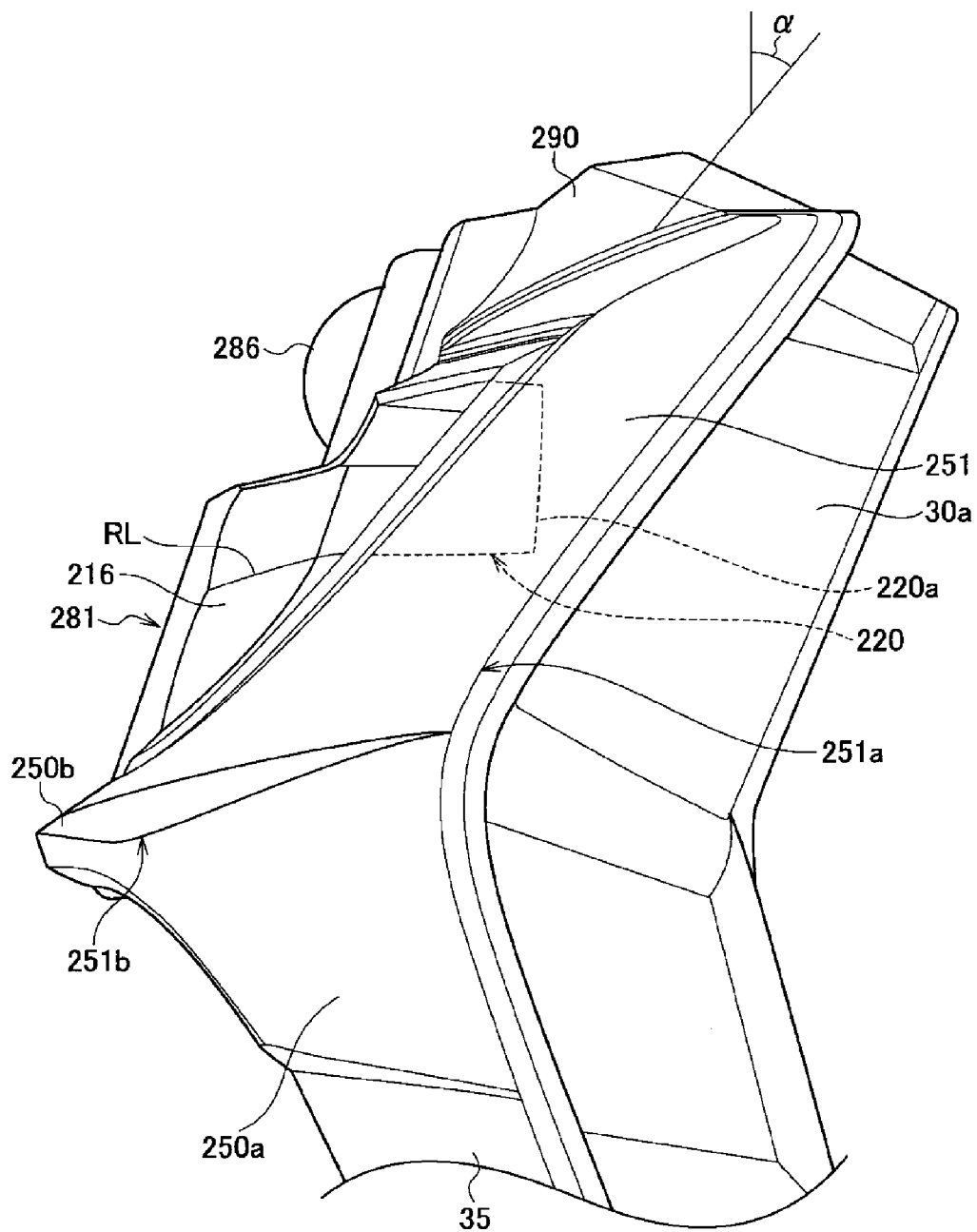

[Fig.7]
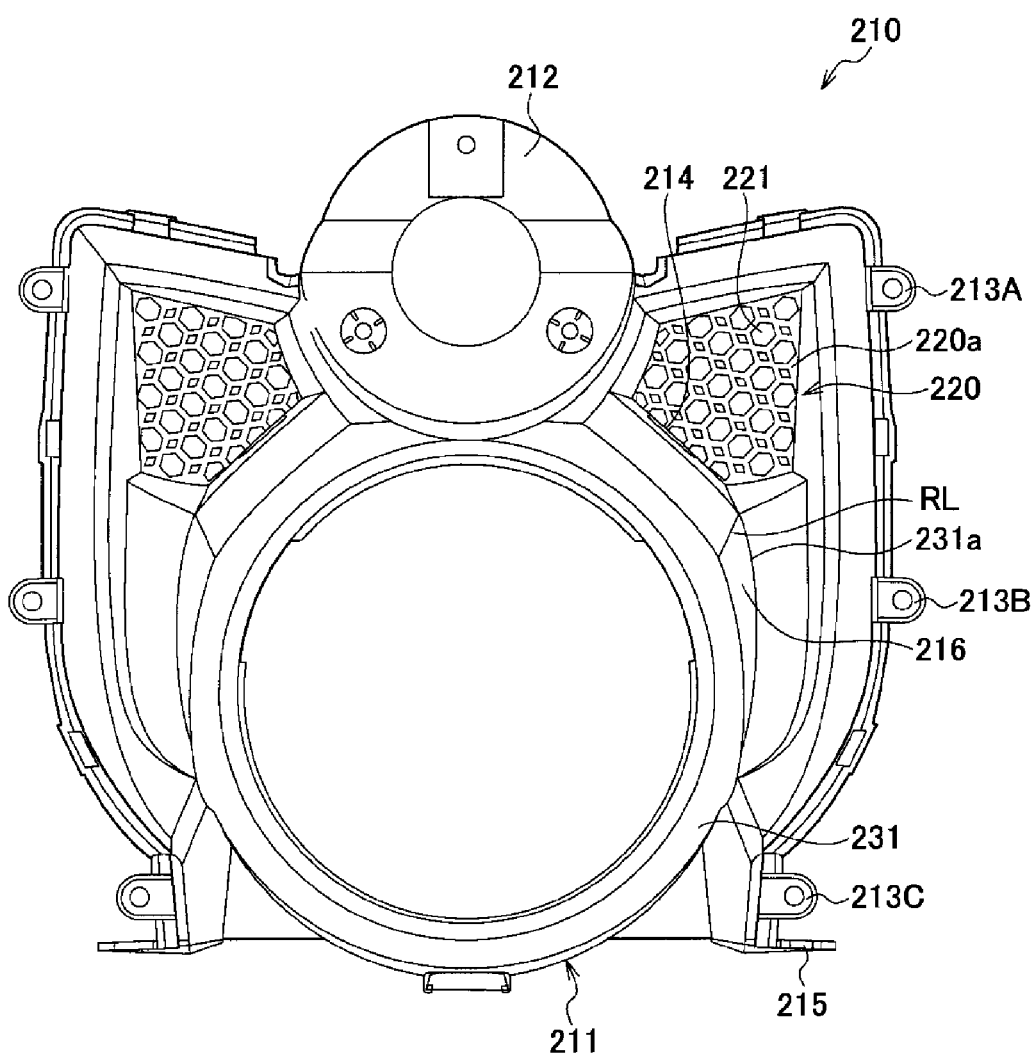

[Fig. 8]
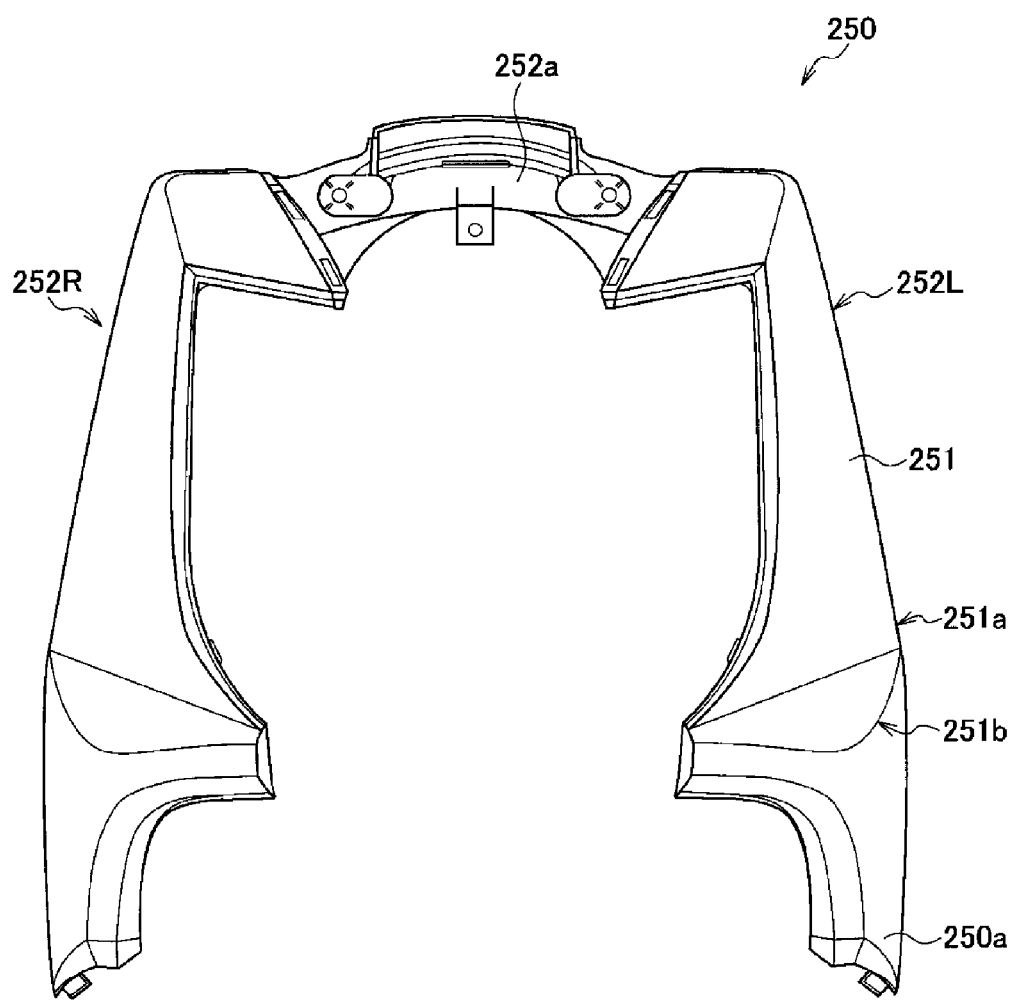

[Fig. 9]
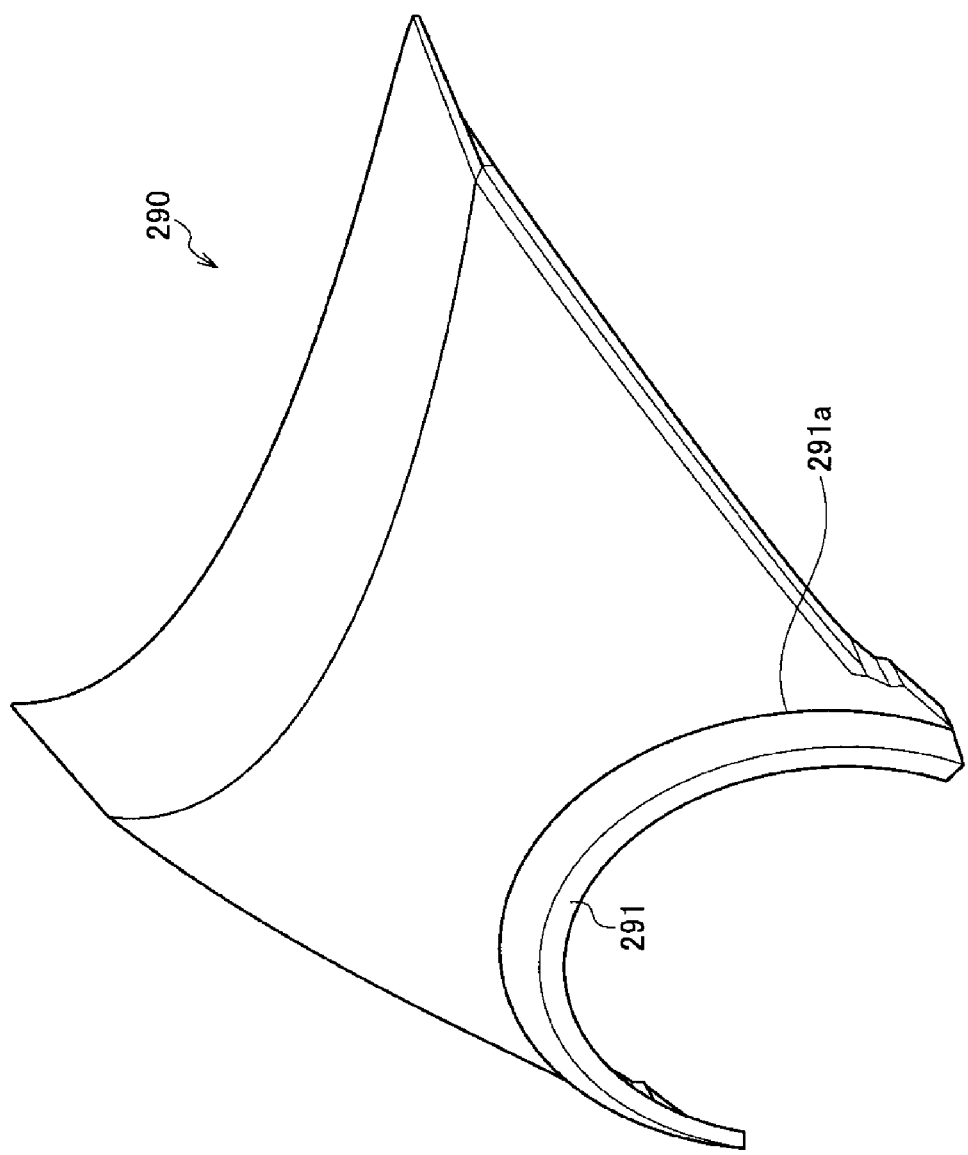

[Fig. 10]
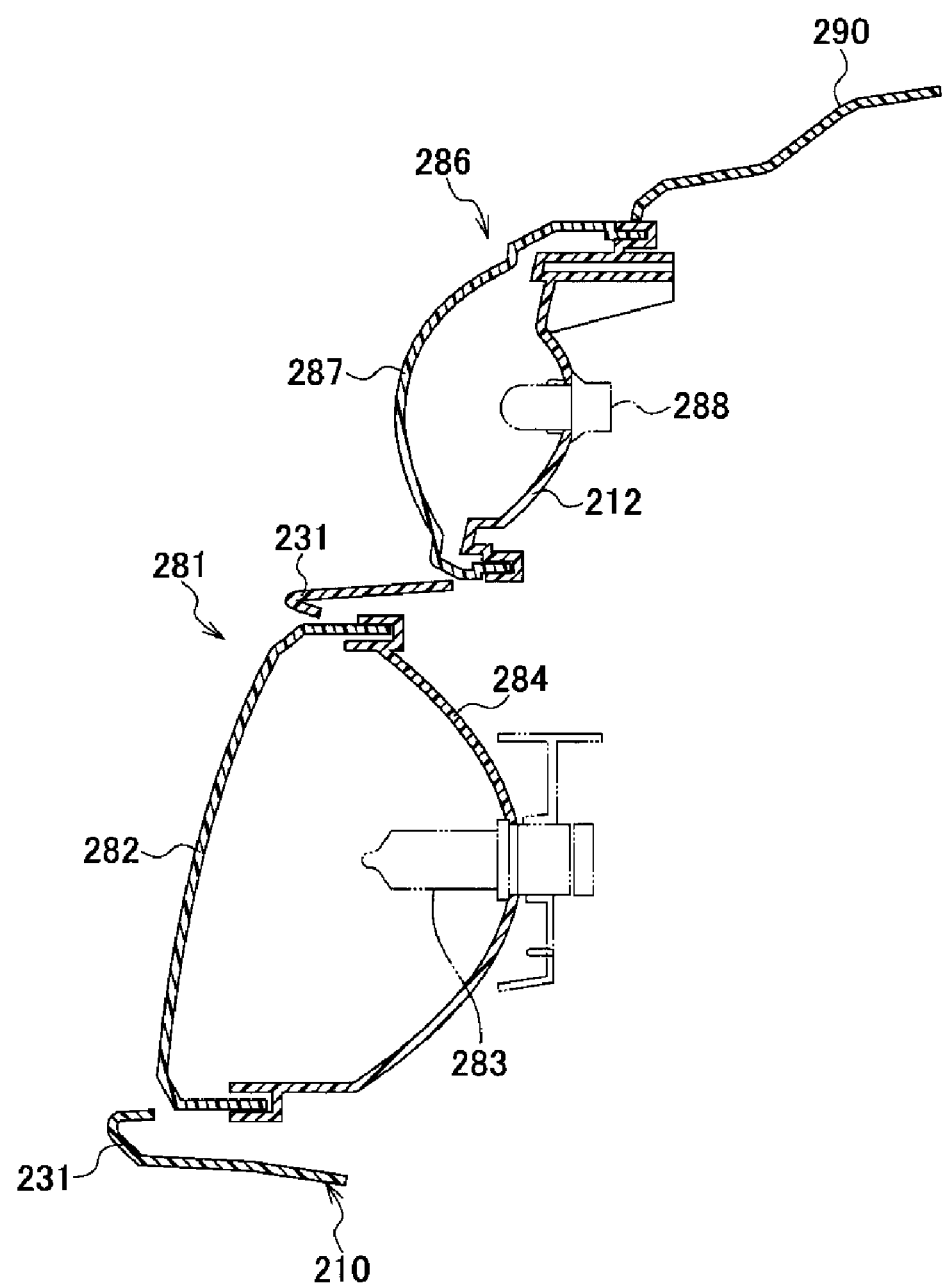

[Fig.11]
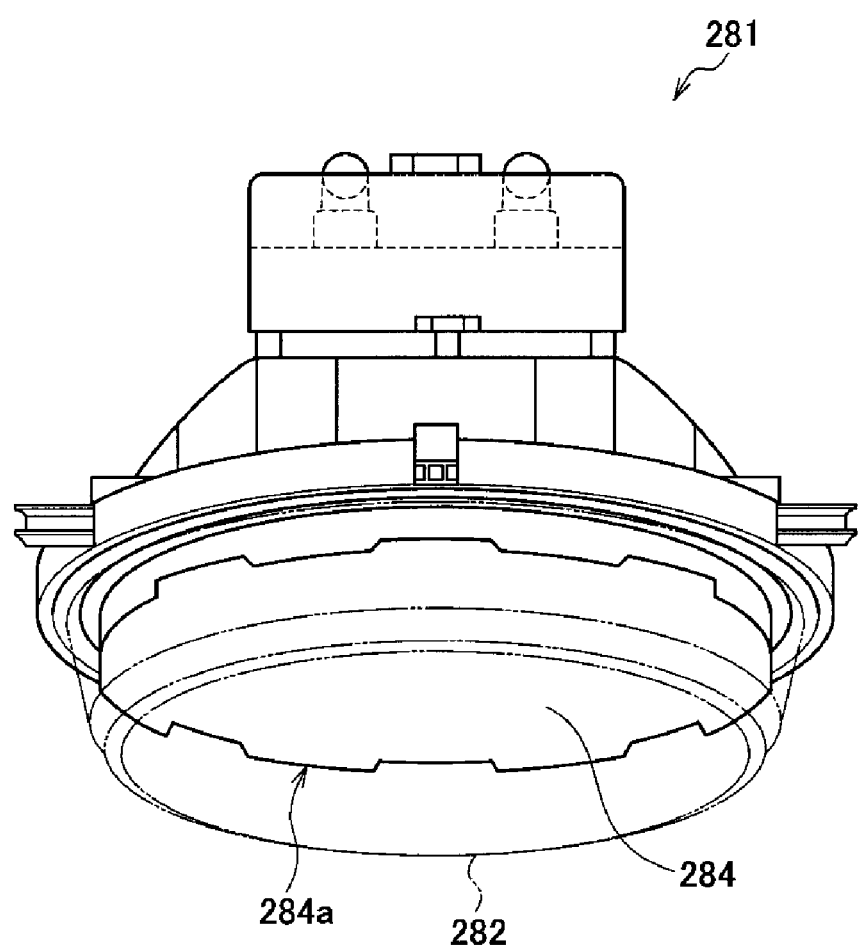

[Fig. 12]
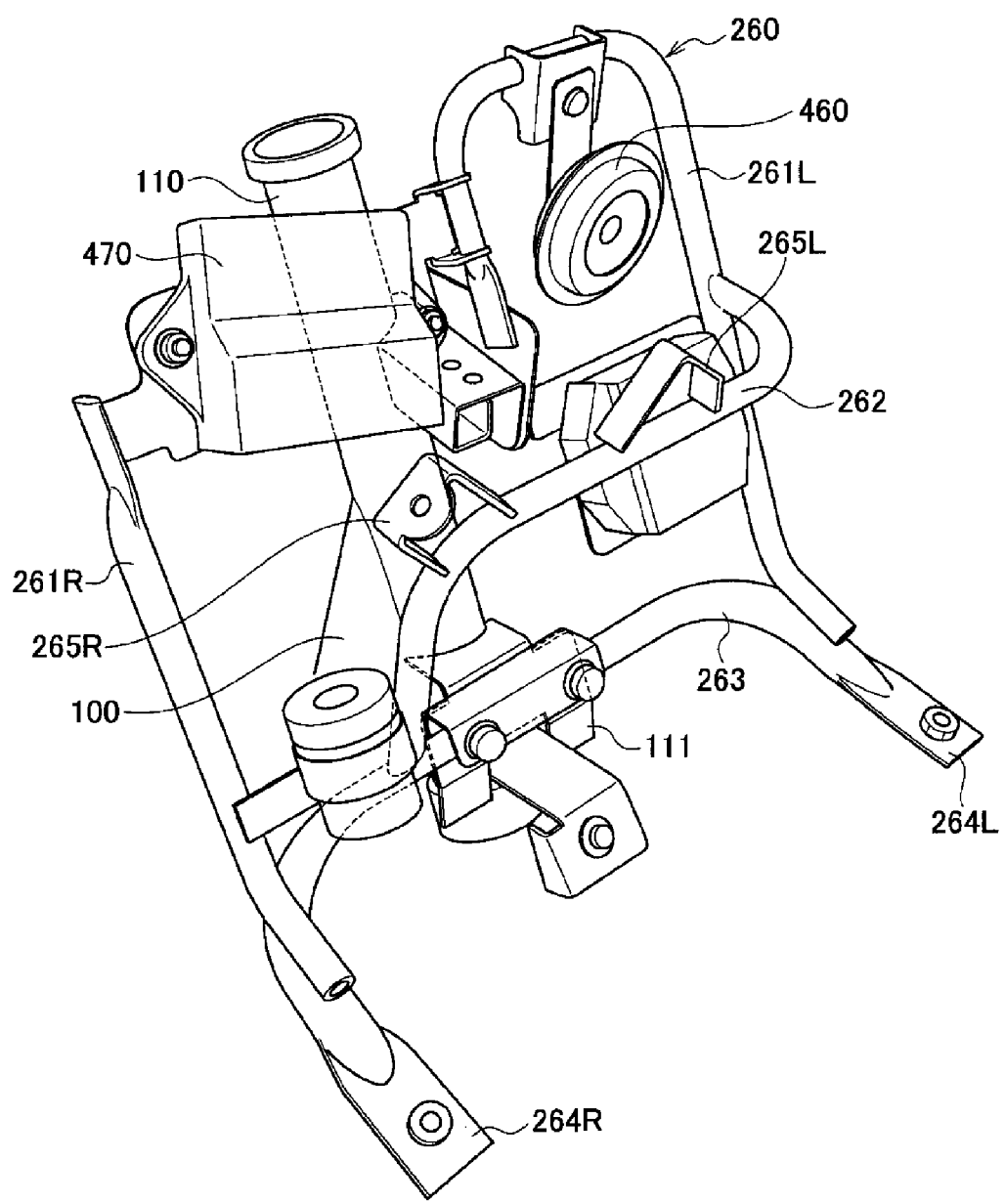

[Fig. 13]
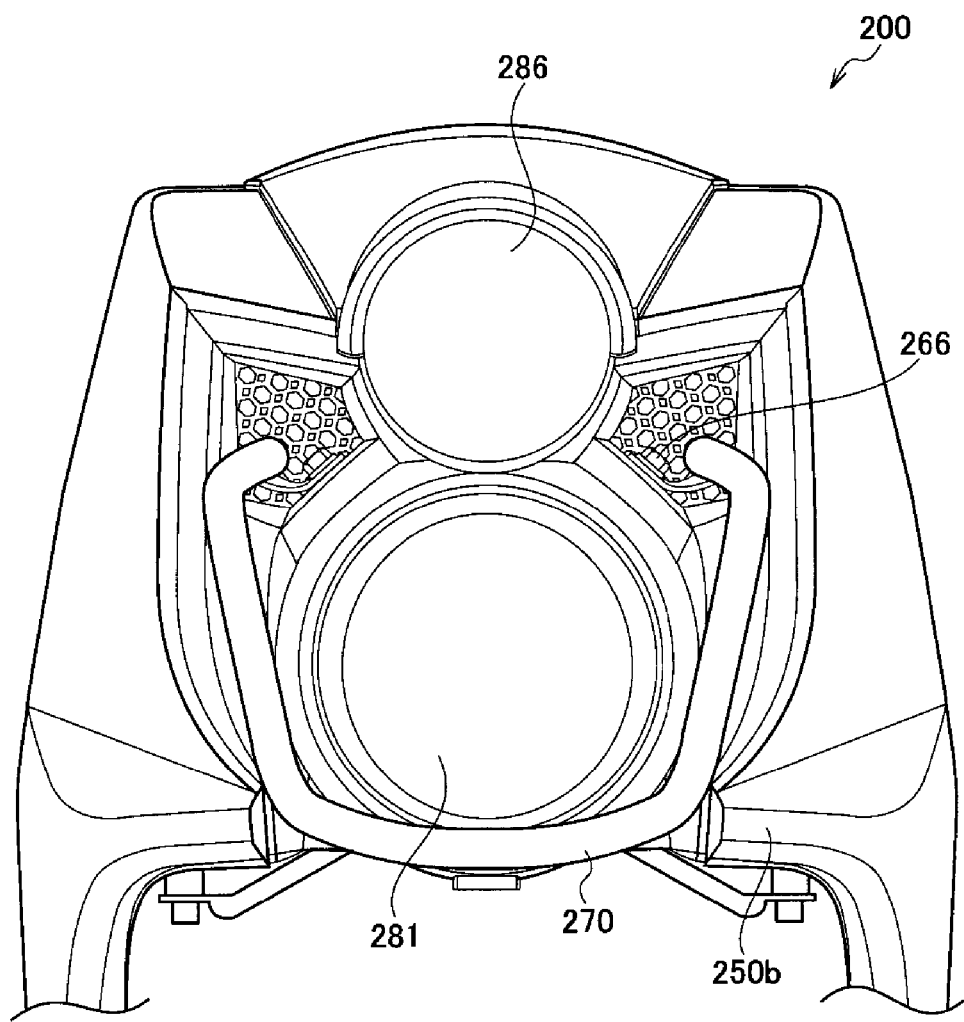

[Fig. 14]
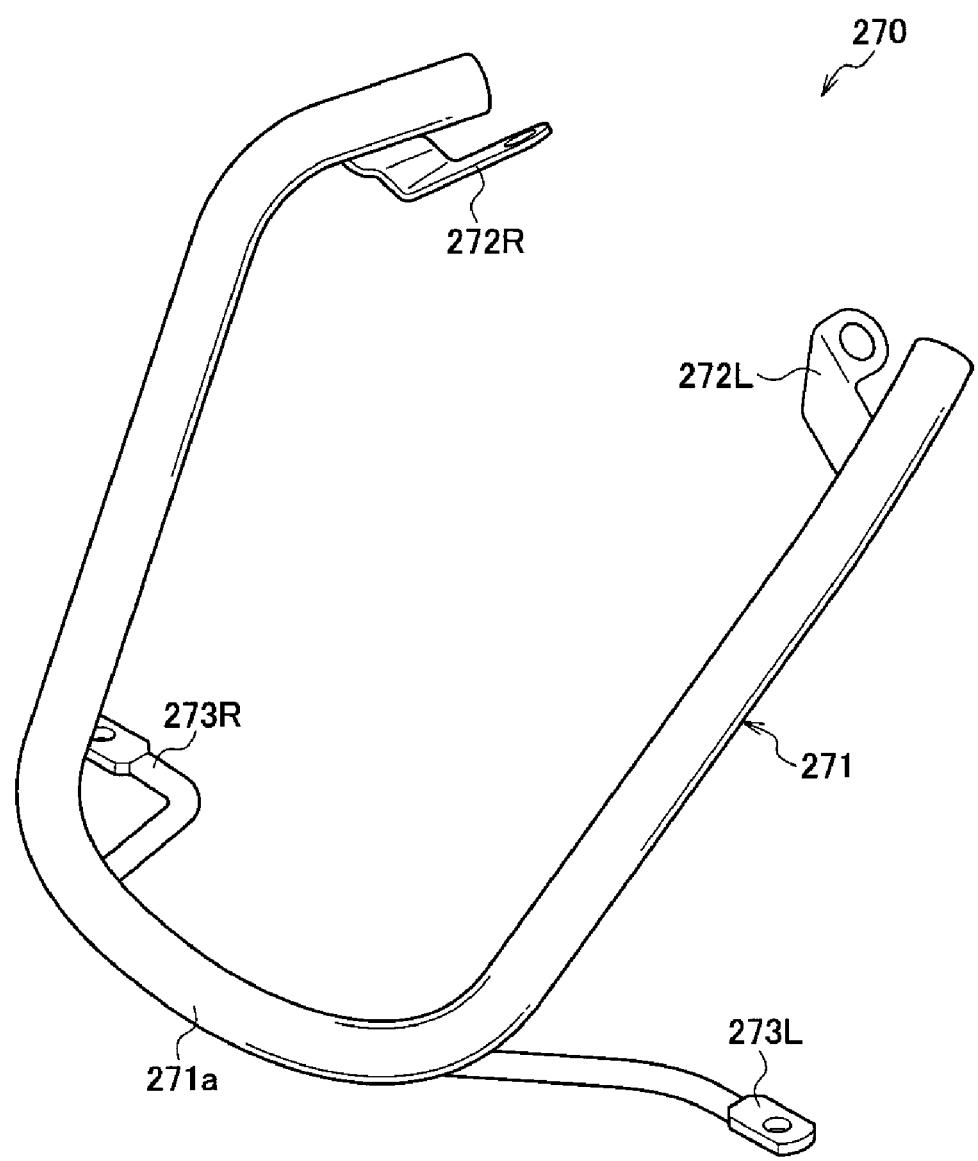

[Fig. 15]
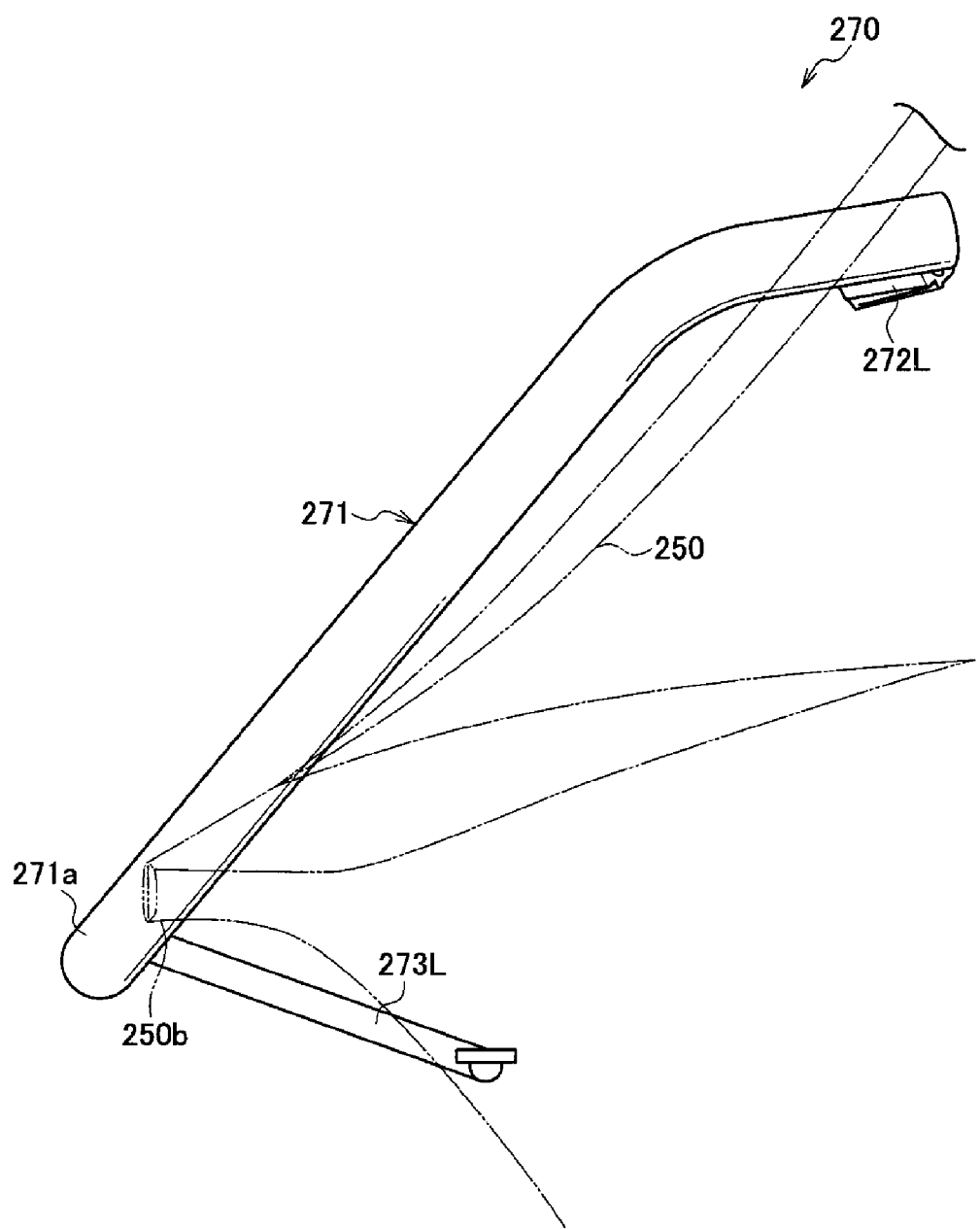

[Fig. 16]
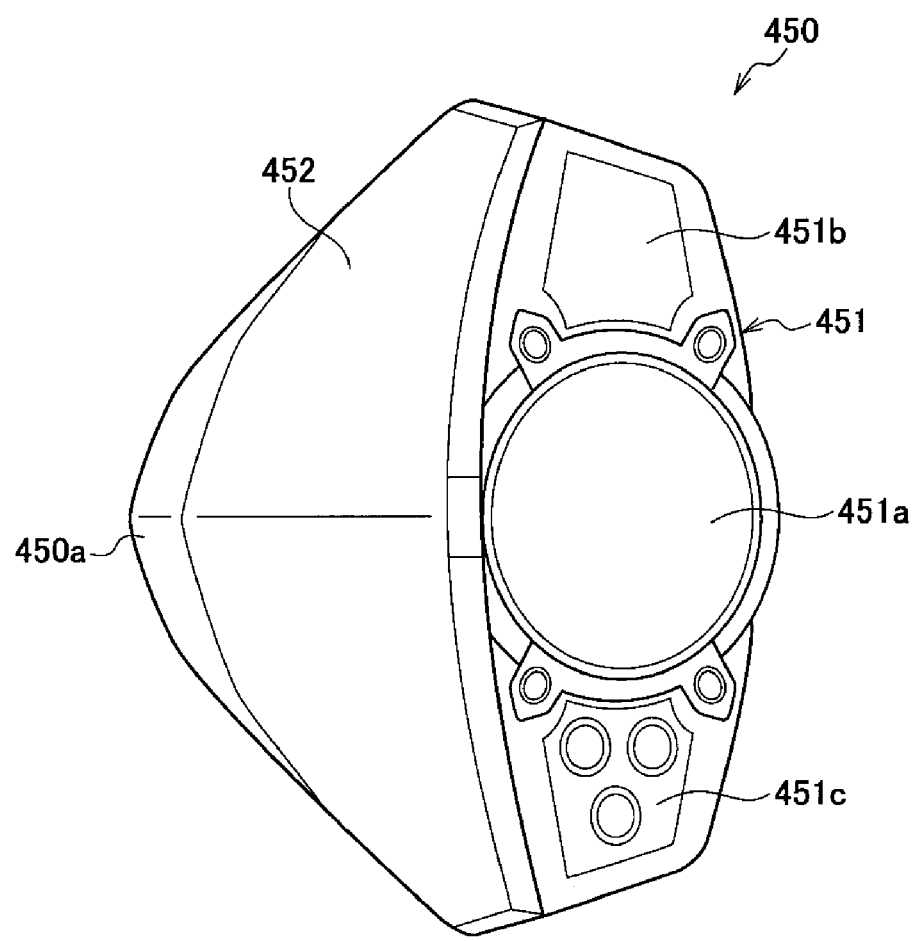

[Fig. 17]
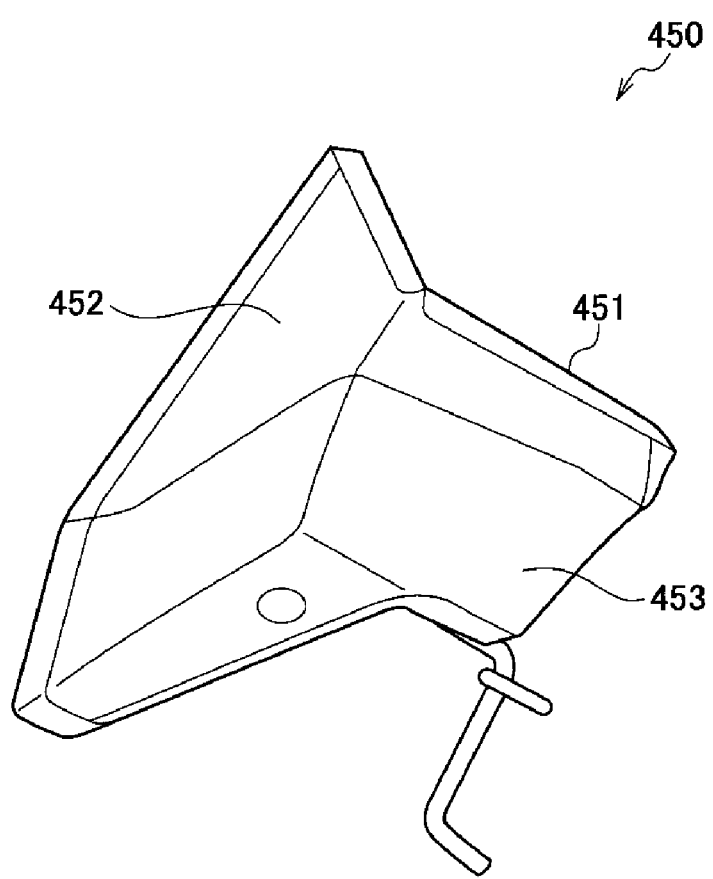

180; # STRADDLE-TYPE VEHICLE

BACKGROUND OF THE INVENTION

1. Technical Field

The present invention relates to a straddle-type vehicle including a front cover part arranged in front of a steering head pipe, and a lighting device disposed on the front cover part.

2. Related Art

In a straddle-type vehicle such as a motorcycle, a method is widely employed in which a front cover part is arranged in front of a steering head pipe so as to reduce air resistance when the straddle-type vehicle is running.

In the straddle-type vehicle, a lighting device such as a head light is disposed on the front cover part. The lighting device has a substantially transparent lens face so as to pass the light of a bulb. The lens face is inclined rearward so as to meet the shape of the surface of the front cover part to reduce the air resistance (for example, patent document 1).

[Patent Document 1] Japanese Unexamined Patent Publication No. 2005-35526 (pages 10-11, FIG. 2)

The lens face of the lighting device has a certain thickness so as to ensure strength. However, the above-mentioned conventional straddle-type vehicle raises the following problem.

Specifically, because the lens face of the lighting device is inclined rearward so as to meet the shape of the surface of the front cover part, the distance that the light emitted from the bulb travels when it passes through the interior of the lens face is longer as compared with a case where the lens face is extended along a vertical direction, in other words, a case where the lens face is substantially perpendicular to the optical axis of light emitted from the bulb. Thus, this raises a problem that the quantity of light emitted via the lens face is decreased.

SUMMARY OF THE INVENTION

Thus, the present invention has been made in view of these circumstances. The object of the present invention is to provide a straddle-type vehicle including a front cover part that can decrease air resistance and which can increase the quantity of light emitted from the lighting device.

To solve the above-mentioned problem, the present invention has the following aspects. Firstly, a first aspect of the present invention is a straddle-type vehicle including a front cover part arranged in front of a steering head pipe and a lighting device disposed on the front cover part. The lighting device includes a first lighting device having a first lens face and a second lighting device arranged above the first lighting device and having a second lens face. The second lighting device is arranged behind or rearward of the first lighting device. The front cover part has an outside cover part formed on the sides of the first lighting device and the second lighting device. The outside cover part is inclined rearward and upward at a specified inclined angle. At least one of the first lens face and the second lens face is inclined at a smaller angle than is the outside cover part when the straddle-type vehicle is viewed from the side.

As described above, according to the straddle-type vehicle, at least one of the first lens face and the second lens face is inclined at a smaller angle than is the outside cover part when the straddle-type vehicle is viewed from the side. In other words, the distance that light emitted from a bulb travels when it passes through the interior of the first lens face and the second lens face is shorter as compared with a case where the first lens face and the second lens face are inclined along the outside cover part. For this reason, a reduction in the quantity of light emitted via the lens face can be prevented.

Moreover, the outside cover part is inclined rearward and upward at the specified inclined angle. For this reason, the air resistance of the front cover part can be reduced.

That is, according to the straddle-type vehicle, it is possible to provide a straddle-type vehicle including a front cover part that can decrease air resistance and can increase the quantity of light emitted from a lighting device.

In addition to the first aspect of the present invention, a second aspect of the present invention is characterized in that both of the first lens face and the second lens face are inclined at a smaller angle than is the outside cover part when the straddle-type vehicle is viewed from the side.

In addition to the second aspect of the present invention, a third aspect of the present invention is characterized in that the first lighting device and the second lighting device are arranged stepwise when the straddle-type vehicle is viewed from the side.

In addition to the third aspect of the present invention, a fourth aspect of the present invention is characterized in that the first lens face and the second lens face are projected from or beyond a surface of the front cover part when the straddle-type vehicle is viewed from the side.

In addition to the fourth aspect of the present invention, a fifth aspect of the present invention is characterized in that the straddle-type vehicle further includes a seat that is arranged behind the steering head pipe and on which a rider can be seated, and a foot rest part disposed in front of the seat. The front cover part is to cover the rider's legs rested on the foot rest part on the front side of the straddle-type vehicle.

In addition to the fifth aspect of the present invention, a sixth aspect of the present invention is characterized in that the outside cover part has a substantially flat face formed on a surface thereof. The flat surface is inclined rearward and upward with respect to the straddle-type vehicle. The height of the flat face is equal to or larger than the height of the first and second lighting devices when the straddle-type vehicle is viewed from a front side.

In addition to the sixth aspect of the present invention, a seventh aspect of the present invention is characterized in that the outside cover part has a projecting portion projecting outward in a vehicle width direction.

In addition to the seventh aspect of the present invention, an eighth aspect of the present invention is characterized in that the outside cover part has a substantially flat face formed on a surface thereof. The flat surface is inclined rearward and upward with respect to the straddle-type vehicle. The projecting portion is more greatly inclined rearward than is the flat face.

In addition to the eighth aspect of the present invention, a ninth aspect of the present invention is characterized in that the straddle-type vehicle includes a foot rest part disposed in front of the seat and a lower cover part extended upward with respect to the straddle-type vehicle from the foot rest part and arranged so as to be in front of the rider's legs. The projecting portion has the lower cover part coupled to a lower portion thereof.

In addition to the ninth aspect of the present invention, a tenth aspect of the present invention is characterized in that a front end portion of the outside cover part is positioned in front of the first lighting device.

In addition to the tenth aspect of the present invention, an eleventh aspect of the present invention is characterized in that the outer dimensions of the second lighting device are smaller than the outer dimensions of the first lighting device.

In addition to the eleventh aspect of the present invention, a twelfth aspect of the present invention is characterized in that the shapes of the first lighting device and the second lighting device are circular when the straddle-type vehicle is viewed from a front side.

In addition to the twelfth aspect of the present invention, a thirteenth aspect of the present invention is characterized in that the straddle-type vehicle further includes a display unit for displaying a state of the straddle-type vehicle. The display unit is arranged above the front cover part. A front face of the display unit is extended along the inclination of the outside cover part when the straddle-type vehicle is viewed from the side.

According to the above-described aspects of the present invention, it is possible to provide a straddle-type vehicle including a front cover part that can decrease air resistance and can increase the quantity of light emitted from the lighting device.

BRIEF DESCRIPTION OF THE DRAWINGS

FIG. 1 is a left side view of a motorcycle 10 according to an embodiment of the present invention.

FIG. 2 is a perspective view of the motorcycle 10 according to the embodiment of the present invention.

FIG. 3 is a front view of the motorcycle 10 according to the embodiment of the present invention.

FIG. 4 is a plan view of the motorcycle 10 according to the embodiment of the present invention.

FIG. 5 is a front view of a front cover 200 according to the embodiment of the present invention FIG. 6 is a left side view of the front cover 200 according to the embodiment of the present invention.

FIG. 7 is a front view of a head light cover 210 according to the embodiment of the present invention.

FIG. 8 is a front view of an outside cover 250 according to the embodiment of the present invention.

FIG. 9 is a perspective view of an upper cover 290 according to the embodiment of the present invention.

FIG. 10 is a sectional view, taken on a line F10-F10 shown in FIG. 5, of the front cover 200.

FIG. 11 is a view of a head light 281 according to the embodiment of the present invention as seen from above a front portion thereof.

FIG. 12 is a perspective view from a right front side of a support bracket 260 according to the embodiment of the present invention.

FIG. 13 is a front view of the front cover 200 according to the embodiment of the present invention with a head light guard 270 attached.

FIG. 14 is a perspective view of the head light guard 270 according to the embodiment of the present invention.

FIG. 15 is another perspective view of the head light guard 270 according to the embodiment of the present invention.

FIG. 16 is a plan view of a meter unit 450 according to the embodiment of the present invention.

FIG. 17 is a left side view of the meter unit 450 according to the embodiment of the present invention.

DETAILED DESCRIPTION OF THE INVENTION

Next, embodiments of a straddle-type vehicle according to the present invention will be described with reference to the drawings. Specifically, (1) the general schematic construction of the straddle-type vehicle, (2) the construction of the front portion of the straddle-type vehicle, (3) the structure and the attachment of a lighting device, (4) the support structure of a front cover part, (5) the shape of a protecting member, (6) the shape of a display unit, (7) operation and effect, and (8) other embodiments will be described.

Here, in the following description of the drawings, same or similar parts are designated by same or similar reference numerals. However, it should be noted that the drawings are schematic ones and that the ratios of respective sizes or the like are different from actual ones.

Thus, the specific sizes or the like should be judged by taking into account the following description. Moreover, of course, there are included parts that are different in the relationship and the ratio of their sizes from the drawings.

(1) General Schematic Construction of Straddle-Type Vehicle

FIG. 1 is a left side view of a motorcycle 10 forming a straddle-type vehicle in the embodiment. FIGS. 2 to 4 show a perspective view, a front view, and a plan view of the motorcycle 10, respectively.

The motorcycle 10 has a front wheel 20 and a rear wheel 90. The motorcycle 10 is a so-called scooter type motorcycle in which a space S is formed in front of a seat 80 on which a rider, specifically, a main rider to drive the motorcycle 10, can be seated. The space S is formed so as to accommodate the legs of the main rider t when the main rider mounts or dismounts, to thereby facilitate the main rider's mounting or dismounting.

The motorcycle 10 has a large-size front fender 400 and a mud guard 640 so as to handle off-road running.

The front wheel 20 has an axle 20a supported by front forks 21L, 21R. The front forks 21L, 21R support the side ends of the axle 20a, respectively. When the front wheel 20 is steered by using a handle bar, the front forks 21L, 21R are turned by the steering operation, along with the front wheel 20, to the right or the left with respect to a direction in which the motorcycle 10 travels.

The front forks 21L, 21R are coupled to each other by an under bracket (not shown). Moreover, a steering shaft (not shown) is rotatably supported by a steering head pipe 110 and coupled to the under bracket.

A leg shield 30 is arranged behind the front wheel 20. The leg shield 30 is positioned in front of the legs of the main rider to thereby prevent running wind from directly hitting the legs of the main rider. A foot board 40 is coupled to the leg shield 30.

The foot board 40 is disposed in front of and below the seat 80. Both feet of the main rider can rest on the foot board 40. A lower cover 35 is arranged below the foot board 40. Foot board 40 may include a surface 41 (see FIG. 4).

The lower cover 35 is extended upward, with respect to the motorcycle 10, from the foot board 40, specifically, from below the foot board 40, and is arranged in front of the legs of the main rider. Specifically, the lower cover 35 is interposed between the front wheel 20 and the leg shield 30. The lower cover 35 is coupled to the leg shield 30, the foot board 40, and a front cover 200.

A unit swing type engine 50 is arranged behind the foot board 40. The unit swing type engine 50 is used as the power unit of the motorcycle 10. Specifically, the unit swing type engine 50 drives the rear wheel 90 via a drive belt (not shown).

The seat 80 is arranged above the unit swing type engine 50. The main rider and a tandem rider can be seated on the seat 80. The seat 80 is supported by a vehicle body frame 100 forming the skeletal frame of the motorcycle 10. The seat 80 is arranged behind the steering head pipe 110 disposed on the vehicle body frame 100.

The front cover 200 covers the front portion of the motorcycle 10. The front cover 200 is arranged in front of the steering head pipe 110 and above the front wheel 20. In other words, the front cover 200 covers the main rider's legs rested on the foot board 40 on the front side of the motorcycle 10.

Moreover, a meter unit 450 for displaying the state (for example, running speed) of the motorcycle 10 is arranged above the front cover 200.

(2) Construction of Front Portion of Straddle-Type Vehicle

Next, the construction of the front portion of the straddle-type vehicle, specifically, the construction of the front cover 200 will be described with reference to FIG. 5 to FIG. 9.

FIG. 5 is a front view of the front cover 200. FIG. 6 is a left side view of the front cover 200.

FIG. 7 is a front view of a head light cover 210 component of the front cover 200. FIG. 8 is a front view of an outside cover 250 component of the front cover 200. FIG. 9 is a perspective view of an upper cover 290 component of the front cover 200.

(2.1) General Construction of Front Portion of Straddle-Type Vehicle

As shown in FIG. 5 and FIG. 6, a head light 281 and an auxiliary light 286 are disposed on the front cover 200. The head light 281 and the auxiliary light 286 are disposed along a longitudinal direction (D1 direction in the drawing).

The head light 281 illuminates an area ahead of the motorcycle 10. The auxiliary light 286 is used as the auxiliary light of the head light 281. Here, the auxiliary light 286 may be used as a position lamp.

The head light 281 and the auxiliary light 286 are disposed separately from each other in the longitudinal direction. The shapes of the head light 281 and the auxiliary light 286 are circular respectively when the motorcycle 10 is viewed from the front side. Moreover, the outer dimensions of the auxiliary light 286 are smaller than the outer dimensions of the head light 281.

The head light 281 and the auxiliary light 286 are disposed stepwise when the motorcycle 10 is viewed from the side. Specifically, the auxiliary light 286 is disposed upward and rearward of the head light 281.

The front cover 200 has the head light cover 210, the outside cover 250, and the upper cover 290.

The head light cover 210 is disposed around the head light 281 and downward and sideward of the auxiliary light 286. In other words, the head light cover 210 is formed along and/or around the outer shapes of the head light 281 and the auxiliary light 286.

The outside cover 250 is formed outside, in a vehicle width direction, of the head light cover 210. In other words, the head light cover 210 and the outside cover 250 are formed as separate parts, respectively. The upper cover 290 is disposed on the top of the outside cover 250.

A substantially flat face 251 is formed on the surface of the outside cover 250. The flat face 251 is inclined rearward and upward with respect to the motorcycle 10. Specifically, the flat face 251 of the outside cover 250 is inclined rearward and upward at an inclined angle α. Moreover, the front end portion 250b of the outside cover 250 is positioned in front of the head light 281.

In this embodiment, the height H11 of the flat face 251 is larger than the height H2 of the head light 281 and the auxiliary light 286 when the motorcycle 10 is viewed from the front side.

The front cover 200 is supported by a support bracket 260 (not shown in FIG. 5 to FIG. 9, see FIG. 12) attached to the steering head pipe 110.

(2.2) Shape of Head Light Cover 210

As shown in FIG. 7, the head light cover 210 has a head light attaching part 211 and an auxiliary light attaching part 212. The head light 281 is attached to the head light attaching part 211. The auxiliary light 286 is attached to the auxiliary light attaching part 212.

Moreover, the head light cover 210 has a bent portion 216 that is bent to form a ridge line RL. The bent portion 216 is formed at an outer edge portion 231 formed on the outer edge of the head light attaching part 211. Here, the head light cover 210 has a bilaterally symmetric shape when it is viewed from the front side, so in FIG. 7 portions positioned only on the left side thereof are denoted by reference numerals.

A depressed portion 220 depressed rearward with respect to the motorcycle 10 is formed above the bent portion 216.

The depressed portion 220 is formed near the head light 281 and the auxiliary light 286. Specifically, a portion of the depressed portion 220 is positioned inside a straight line L1 shown in FIG. 5, in other words, closer to the center of the motorcycle 10 when the motorcycle 10 is viewed from the front side. The straight line L1 passes an outside end 231a (see FIG. 7) of the outer edge portion 231 positioned outside the head light 281, and passes an outside end 291a (see FIG. 9) of an outer edge portion 291.

A plurality of holes 221 is formed in the bottom face 220a of the depressed portion 220. The hole 221 is pentagonal. The head light cover 210 has the bent portion 216 and the depressed portion 220 and hence is formed in a more projected and depressed shape than the outside cover 250.

The head light cover 210 has engaging parts 213A to 213C. The engaging parts 213A to 213C are engaged with bosses (not shown) disposed on the outside cover 250. The head light cover 210 and the outside cover 250 are coupled to each other by tapping screws (not shown).

(2.3) Shape of Outside Cover 250

As shown in FIG. 8, the outside cover 250 has a left cover region 252L, a right cover region 252R, and a coupling portion 252a.

The left cover region 252L is formed on one side, specifically, on the left side of the head light cover 210. The right cover region 252R is formed on the other side, specifically, on the right side of the head light cover 210. In other words, the outside cover 250 is formed on the sides of the head light 281 and the auxiliary light 286.

The left cover region 252L and the right cover region 252R are coupled to each other at a portion of the periphery of the head light cover 210. Specifically, the left cover region 252L and the right cover region 252R are coupled to each other above the head light cover 210. In other words, the left cover region 252L and the right cover region 252R are coupled to each other via the coupling portion 252a positioned above the head light cover 210.

The outside cover 250 has a projecting region 251a. Here, like FIG. 7, the outside cover 250 has a bilaterally symmetric shape, so in FIG. 8 portions positioned only on the left side are denoted by reference numerals.

The projecting region 251a is formed on the flat face 251. The projecting region 251a projects outward in the vehicle width direction of the width W1 (see FIG. 3) of the front fork 21L and the front fork 21R when the motorcycle 10 is viewed from the front side.

Moreover, the outside cover 250 has a projecting region 251b. The projecting region 251b projects outward in the vehicle width direction of the flat face 251. The projecting region 251b is formed below the projecting region 251a. Specifically, the projecting region 251b is formed in a lower end portion 250a of the outside cover 250.

As shown in FIG. 6, the projecting region 251b is more inclined rearward than the projecting region 251a. The projecting region 251a is inclined rearward and upward at the inclined angle α. On the other hand, the projecting region 251b is more greatly inclined rearward than the flat face 251, specifically, the projecting region 251a, in other words, at an inclined angle larger than the inclined angle α.

The lower cover 35 is coupled to the lower portion of the projecting region 25 lb. Moreover, the upper portion 30a of the leg shield 30 is inclined rearward and upward according to the inclined angle α of the flat face 251.

(2.4) Shape of Upper Cover 290

As shown in FIG. 9, the upper cover 290 has the outer edge portion 291 shaped to fit along and/or around the periphery of the auxiliary light 286. In other words, the outer edge portion 291 is formed on, e.g., disposed at, an outer edge of the auxiliary light 286.

The upper cover 290 is attached to the coupling portion 252a (see FIG. 8) of the left cover region 252L and the right cover region 252R. As shown in FIG. 5, the upper cover 290 is shaped like an arch when the motorcycle 10 is viewed from the front side.

(3) Structure and Attachment of Lighting Device

Next, the structure and the attachment of a lighting device attached to the front cover 200, specifically, the head light 281 and the auxiliary light 286, will be described with reference to FIG. 10 and FIG. 11.

FIG. 10 is a sectional view, taken on a line F10-F10 shown in FIG. 5, of the front cover 200. FIG. 11 is a view of the head light 281 from above a front portion thereof.

As shown in FIG. 10, the head light 281 and the auxiliary light 286 are arranged stepwise when the motorcycle 10 is viewed from the side. Specifically, the auxiliary light 286 is arranged upward and rearward of the head light 281.

The head light 281 has a lens face 282, a bulb 283, and a reflector 284.

The lens face 282 is fitted in the reflector 284. The lens face 282 is inclined at a smaller angle than is the outside cover 250, specifically, the flat face 251 of the outside cover 250, when the motorcycle 10 is viewed from the side. In other words, an inclined angle of the lens face 282 is smaller than the inclined angle α (see FIG. 6).

The surroundings of the lens face 282 are covered with the outer edge portion 231 of the head cover 210.

As shown in FIG. 11, the front edge portion 284a of the reflector 284 is circular. Moreover, in this embodiment, the front edge portion 284a is formed in a shape projected and depressed repeatedly at substantially equal intervals, e.g., the front edge portion 284a is serrated.

The auxiliary light 286 has a lens face 287 and a bulb 288. The lens face 287 is fitted in the auxiliary light attaching part 212 of the head light cover 210. The lens face 287, specifically, the front portion of the bulb 288, like the lens face 282, is also inclined at a smaller angle than one of the outside cover 250, specifically, of the flat face 251 when the motorcycle 10 is viewed from the side.

The lens face 282 and the lens face 287 are projected from or beyond the surface of the front cover 200, in other words, e.g., beyond the flat face 251 when the motorcycle 10 is viewed from the side.

(4) Support Structure of Front Cover Part

Next, the support structure of the front cover part, that is, the front cover 200, will be described with reference to FIG. 12. FIG. 12 is a perspective view, when viewed from the right front, of the support bracket 260 attached to the steering head pipe 110.

As shown in FIG. 12, the support bracket 260 is attached to a bracket attaching part 111 disposed on the steering head pipe 110.

The support bracket 260 has longitudinal pipe parts 261L, 261R, a lateral pipe part 262, and a lower pipe part 263. The support bracket 260 supports the front cover 200, in other words, the head light cover 210, to which the head light 281 and the auxiliary light 286 are attached, and the outside cover 250 with which the head light cover 210 is combined.

The longitudinal pipe parts 261L, 261R are joined to the lower pipe part 263. A horn 460 is attached to the longitudinal pipe part 261L. The horn 460 produces a sonic signal of a specified sound level when a main rider presses down a horn button (not shown). The horn 460 is arranged behind the bottom face 220a of the depressed portion 220.

A main switch unit 470 for turning on or off electric power to be supplied to electric parts such as a starter (not shown) mounted on the motorcycle 10 is interposed between the longitudinal pipe part 261L and the longitudinal pipe. part 261R. The main switch unit 470 can be operated by using a main key (not shown). The slot of the main key is disposed in the upper portion 30a of the leg shield 30.

The lateral pipe part 262 is joined to the longitudinal pipe part 261L and the lower pipe part 263. Support stay parts 265L, 265R are disposed to the lateral pipe part 262. The head light cover 210 is attached to the support stay parts 265L, 265R. Specifically, a bolt hole 214 (see FIG. 7) formed in the head light cover 210 is arranged to overlap a screw hole (not shown) formed in the support stay part 265L (265R).

The lower pipe part 263 is fixed to the bracket attaching part 111. The head light cover 210 is also attached to the support stay parts 264L, 264R at the front ends of the lower pipe part 263. Specifically, a bolt hole 215 (see FIG. 7) formed in the head light cover 210 is arranged to overlap a screw hole (not shown) formed in the support stay part 264L (264R).

As shown in FIG. 5 and FIG. 7, a bolt 266 is passed through the bolt hole 214 and is screwed into the screw hole formed in the support stay part 265L (265R). Here, although not shown in FIG. 5, a bolt of the same shape as the bolt 266 is passed through the bolt hole 215 and is screwed into the screw hole formed in the support stay part 264L (264R).

Moreover, the position of the support stay part 265L (265R) and the bolt 266 is arranged near the head light 281 and the auxiliary light 286. More specifically, the support stay part 265L (265R) is disposed on an inner wall surface (not shown) forming the depressed portion 220.

Specifically, the position of the bolt 266 is arranged inside the straight line L1 shown in FIG. 5, in other words, closer to the center of the motorcycle 10 when the motorcycle 10 is viewed from the front side.

The straight line L1 passes the outside end 231a (see FIG. 7) of the outer edge portion 231 positioned outside the head light 281 and the outside end 291a (see FIG. 9) of the outer edge portion 291.

(5) Shape of Protecting Member

Next, the shape of a protecting member arranged in front of the front cover 200 will be described with reference to FIG. 13 to FIG. 15.

FIG. 13 is a front view of the front cover 200 to which a head light guard 270 forming the protecting member in the embodiment is attached. FIG. 14 is a perspective view of the head light guard 270. Moreover, FIG. 15 is a left side view of the head light guard 270.

The head light guard 270 can be attached, as optional equipment, to the front cover 200 (support bracket 260).

The head light guard 270 is arranged along the periphery of the head light 281 and the auxiliary light 286. Specifically, the head light guard 270 is arranged downward and sideward of the head light 281 and downward of the auxiliary light 286. In other words, the head light guard 270 is arranged in front of the front cover 200 and is separated from the head light 281 and the auxiliary light 286.

The head light guard 270 is shaped like a round bar. Specifically, the head light guard 270 is formed of a round pipe member.

The head light guard 270 has a guard pipe part 271, upper stay parts 272L, 272R, and lower stay parts 273L, 273R.

The guard pipe part 271 is formed in the shape of a letter U with a lower part 271a when it is viewed from the front side. The upper stay part 272L (272R) is fixed to the support stay part 265L (265R) along with the head light cover 210 (see FIG. 12). The lower stay part 273L (273R) is fixed to the support stay part 264L (264R) along with the head light cover 210 (see FIG. 12).

Moreover, as shown in FIG. 15, the head light guard 270 is arranged in front of the outside cover 250 and is separated from the outside cover 250.

(6) Shape of Display Unit

Next, the shape of the meter unit 450 forming a display unit in the embodiment will be described with reference to FIG. 16 and FIG. 17. FIG. 16 is a plan view of the meter unit 450. FIG. 17 is a left side view of the meter unit 450.

As shown in FIG. 16 and FIG. 17, the meter unit 450 has a display part 451, a front panel part 452, and a body part 453.

The display part 451 displays the state of the motorcycle 10. Specifically, a speedometer 451a, a fuel meter 451b, and an alarm lamp part 451c are disposed on the display part 451.

The front panel part 452 is attached to the body part 453. The front portion of the meter unit 450, specifically, the front panel part 452 is extended along the inclination of the flat face 251 of the outside cover 250 when the motorcycle 10 is viewed from the side.

Moreover, the lower edge portion 450a of the meter unit 450 is formed in the shape of a letter V when the motorcycle 10 is viewed from the front side or in a plan view.

(7) Operation and Effect

According to the motorcycle 10, the lens face 282 of the head light 281 and the lens face 287 of the auxiliary light 286 are inclined at a smaller angle than is the outside cover 250. Specifically, the head light 281 and the auxiliary light 286 are arranged stepwise when the motorcycle 10 is viewed from the side. Moreover, the lens face 282 and the lens face 287 are projected from or beyond the flat face 251 formed on the front cover 200.

In other words, the distance that light emitted from the bulb 283 (bulb 288) travels when it passes through the interior of the lens face 282 (lens face 287) is shorter as compared with a case where the lens face 282 and the lens face 287 are inclined along the outside cover 250. Hence, a reduction in the quantity of light emitted via the lens face 282 (lens face 287) can be prevented.

In the embodiment, the outside cover 250 is inclined rearward and upward at the inclined angle α. Moreover, the front end portion 250b of the outside cover 250 is positioned in front of the head light 281. Furthermore, the front panel part 452 of the meter unit 450 is extended along the inclination of the outside cover 250 when the motorcycle 10 is viewed from the side. Hence, the air resistance of the front cover 200 can be reduced.

In the embodiment, the height H1 of the flat face 251 of the outside cover 250 is larger than the height H2 of the head light 281 and the auxiliary light 286. Moreover, the outside cover 250 has the projecting region 251b.

Moreover, the flat face 251 is formed on both sides of the head light cover 210, specifically, in the left cover region 252L and the right cover region 252R. The lower cover 35 is coupled to the lower portion of the projecting region 251b.

Accordingly, a reduction in the quantity of light emitted via the lens face 282 (lens face 287) can be prevented by reducing the inclination of the lens face 282 (lens face 287), and the air resistance around the front cover 200 can be further reduced.

Moreover, in the embodiment, the projecting region 251b is more greatly inclined rearward than the flat face 251. Hence, a down force to press the motorcycle 10 downward can be produced by the air resistance around the front cover 200, in particular, by the running wind passing over the surface of the front cover 200.

(8) Other Embodiments

As described above, the contents of the present invention have been disclosed through one embodiment of the present invention, but it should be understood that the descriptions and the drawings of a portion of this disclosure do not limit the present invention. Various alternative embodiments will be apparent to those skilled in the art from the disclosure.

For example, the above-mentioned embodiment can be constructed so that the inclination angles of both of the lens face 282 of the head light 281 and the lens face 287 of the auxiliary light 286 are smaller than that of the outside cover 250 when the motorcycle 10 is viewed from the side. However, the inclination angle of any one of the lens face 282 and the lens face 287 may be smaller than that of the outside cover 250.

In the above-mentioned embodiment, the head light 281 and the auxiliary light 286 are circular, but any one of the head light 281 and the auxiliary light 286 or both of the lights are not necessarily circular. Moreover, the outer dimensions of the auxiliary light 286 may be similar to those of the head light 281.

In the above-mentioned embodiment, the bent portion 216 and the depressed portion 220 are formed on the head light cover 210. However, if the head light cover 210 is formed in the depressed and projected shape, the bent portion 216 and the depressed portion 220 are not necessarily formed.

In the above-mentioned embodiment, the height H1 of the flat face 251 of the outside cover 250 is made larger than the height H2 of the head light 281 and the auxiliary light 286. However, the height H1 may be substantially equal to the height H2 or smaller than the height H2.

Moreover, the projecting region 251a and the projecting region 251b are not necessarily formed.

As described above, of course, the present invention includes various embodiments not described above. Thus, it should be understood that the technical scope of the present invention is defined only by the specified terms of the invention as claimed in the claims that are appropriate from the above descriptions.

Industrial Applicability

The present invention is useful for a straddle-type vehicle such as a motorcycle since air resistance can be reduced and quantity of light emitted from a lighting device can be increased.

The invention claimed is:

1. A straddle-type vehicle comprising:
a front cover part arranged in front of a steering head pipe; and
a lighting device disposed on the front cover part, wherein the lighting device includes
a first lighting device having a first lens face, and
a second lighting device arranged above the first lighting device and having a second lens face, wherein
the second lighting device is arranged rearward of the first lighting device, the front cover part has an outside cover part formed on sides of the first lighting device and the second lighting device, the outside cover part is inclined rearward and upward at a specified inclined angle, and at least one of the first lens face and the second lens face is inclined at a smaller angle than is the outside cover part when the straddle-type vehicle is viewed from a side.

2. The straddle-type vehicle as claimed in claim 1, wherein both of the first lens face and the second lens face are inclined at a smaller angle than is the outside cover part when the straddle-type vehicle is viewed from the side.

3. The straddle-type vehicle as claimed in claim 2, wherein the first lighting device and the second lighting device are arranged stepwise when the straddle-type vehicle is viewed from the side.

4. The straddle-type vehicle as claimed in claim 3, wherein the first lens face and the second lens face are projected beyond a surface of the front cover part when the straddle-type vehicle is viewed from the side.

5. The straddle-type vehicle as claimed in claim 1, further comprising:

a seat arranged behind the steering head pipe; and a foot rest part disposed in front of the seat, wherein the front cover part is to cover a rider's legs rested on the foot rest part on a front side of the straddle-type vehicle.

6. The straddle-type vehicle as claimed in claim 1, wherein the outside cover part has a substantially flat face formed on a surface thereof, the flat face is inclined rearward and upward with respect to the straddle-type vehicle, and a height of the flat face is equal to or larger than a height of the first and second lighting devices when the straddle-type vehicle is viewed from a front side.

7. The straddle-type vehicle as claimed in claim 1, wherein the outside cover part has a projecting portion projecting outward in a vehicle width direction.

8. The straddle-type vehicle as claimed in claim 7, wherein the outside cover part has a substantially flat face formed on a surface thereof, the flat face is inclined rearward and upward with respect to the straddle-type vehicle, and the projecting portion is more greatly inclined rearward than is the flat face.

9. The straddle-type vehicle as claimed in claim 7, further comprising:

a foot rest part disposed in front of the seat;

a lower cover part extended upward with respect to the straddle-type vehicle from the foot rest part and arranged so as to be in front of a rider's legs, wherein the projecting portion has the lower cover part coupled to a lower portion thereof.

10. The straddle-type vehicle as claimed in claim 1, wherein a front end portion of the outside cover part is positioned in front of the first lighting device.

11. The straddle-type vehicle as claimed in claim 1, wherein outer dimensions of the second lighting device are smaller than outer dimensions of the first lighting device.

12. The straddle-type vehicle as claimed in claim 1, wherein shapes of the first lighting device and the second lighting device are circular when the straddle-type vehicle is viewed from a front side.

13. The straddle-type vehicle as claimed in claim 1, further comprising a display unit to display a state of the straddle-type vehicle, wherein the display unit is arranged above the front cover part, and a front face of the display unit is extended along an inclination of the outside cover part when the straddle-type vehicle is viewed from the side.

* * * * *